United States Patent [19]

DeMichele et al.

[11] Patent Number: 5,013,209

[45] Date of Patent: May 7, 1991

[54] WHEEL LIFT TOWING DOLLY

[75] Inventors: Mardon DeMichele, Mesa, Ariz.; Jules G. Patout, New Iberia, La.

[73] Assignee: Towing Technologies, Inc., Alexandria, Va.

[21] Appl. No.: 379,948

[22] Filed: Jul. 14, 1989

[51] Int. Cl.⁵ .............................................. B60P 3/12
[52] U.S. Cl. .................................. 414/563; 414/426; 414/595; 280/402
[58] Field of Search .............. 414/563, 463, 466, 426, 414/427, 428, 429, 430, 595, 596, 522, 525.9, 560, 563, 599, 500, 499, 494; 280/402, 490.1

[56] References Cited

U.S. PATENT DOCUMENTS

| | | | |
|---|---|---|---|
| 1,161,878 | 11/1915 | O'Leary | 414/539 X |
| 3,152,704 | 10/1964 | Russell | 414/563 |
| 3,175,716 | 3/1965 | Masseria | 414/595 X |
| 3,312,362 | 4/1967 | Gilmore | 414/430 |
| 3,361,227 | 1/1968 | Johnson et al. | 414/430 |
| 3,458,068 | 7/1969 | Scott | 414/563 |
| 3,485,400 | 12/1969 | Pewthers | 414/522 X |
| 3,510,016 | 5/1970 | Wolff et al. | 280/402 X |
| 3,613,921 | 10/1971 | Ryden et al. | 414/430 X |
| 3,627,154 | 12/1971 | Troup | 414/563 |
| 3,720,330 | 3/1973 | Forse et al. | 280/402 X |
| 3,827,586 | 8/1974 | Lambert | 414/563 |
| 3,896,949 | 7/1975 | Shipley | 280/402 X |
| 4,214,771 | 7/1980 | Mason | 280/402 |
| 4,514,132 | 4/1985 | Law et al. | 280/490.1 X |
| 4,737,066 | 4/1988 | Allison | 414/563 |
| 4,741,661 | 5/1988 | Carey | 414/563 |
| 4,778,333 | 10/1988 | Youmans et al. | 280/402 X |
| 4,793,763 | 12/1988 | Bubik | 414/563 |

FOREIGN PATENT DOCUMENTS 0403601 10/1924 Fed. Rep. of Germany ...... 414/539
0448550 8/1927 Fed. Rep. of Germany ...... 414/539

Primary Examiner—David A. Bucci
Assistant Examiner—John Vanden Bosche
Attorney, Agent, or Firm—Rogers & Killeen

[57] ABSTRACT

A towable dolly having a wheel lift mechanism for towing a vehicle by lifting the towed vehicle by its wheels so that contact with the vehicle's bumper, undercarriage, or axle is avoided and the vehicle rides on its own suspension system. The towing dolly is provided with an inclined rail carrying a carriage with a wheel lift mechanism extending generally horizontally and rearwardly therefrom as the carriage moves along the rail. An inflatable bag may be used to assist the wheel lift, or in lieu thereof.

45 Claims, 5 Drawing Sheets

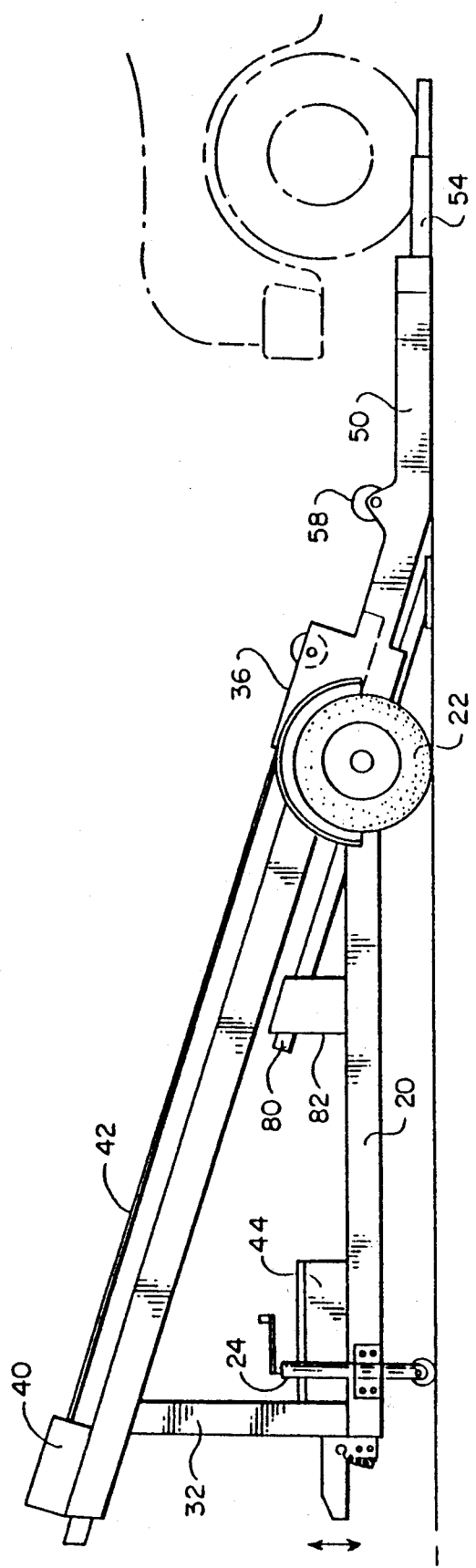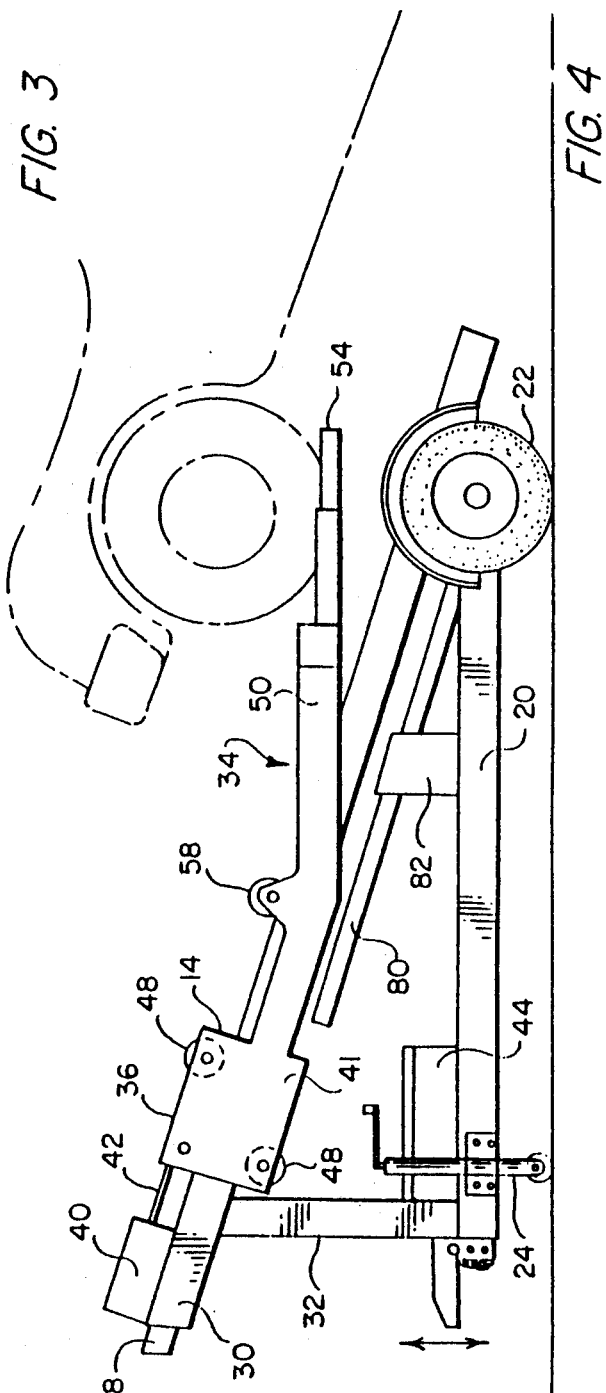

WHEEL LIFT TOWING DOLLY

BACKGROUND OF THE INVENTION

The present invention relates to a towable dolly for towing a four wheeled vehicle with another vehicle such as a passenger car or a pickup truck not normally equipped for towing. More particularly, it relates to a towing dolly with a "wheel lift" towing system.

Disabled vehicle towing has long been recognized as a problem for persons who do not have access to the traditional tow truck or to those to whom the purchase of such a single-purpose vehicle is not economically attractive. Diverse types of towing dollies for towing a vehicle without a tow truck have been proposed as solutions to this problem.

Typically, such dollies have a frame with road-engaging wheels and a hitch for detachably connecting the frame to the towing vehicle. Many of the dollies have a hoisting device for elevating one end of the vehicle to be towed. In all towing dollies, one end of the vehicle being towed is supported on the road surface by its wheels and the wheels at the other end are supported by the dolly out of engagement with the road surface. The hoisting device of such towing dollies is generally affixed to a bumper, undercarriage, or axle of the towed vehicle. Such attachment devices cannot be used with certain vehicles with collapsible bumpers and/or easily deformed panels without damaging the towed vehicle because such bumpers and/or panels are in contact with the lifting mechanism and cannot structurally withstand the weight of one end of the vehicle being towed.

In addition, modern automobiles may be of unibody construction such that pressure unevenly applied to the vehicle by the lifting mechanism, e.g., during turns, may torque and crack the unibody.

As shown in FIG. 1, existing dollies generally include a wheeled frame removably attached to a towing vehicle such as a car by a conventional ball and cup trailer hitch. Such frames provide an inclined rail 10 on which a carriage 12 may ride under the influence of an electric wrench 14. The carriage 12 generally includes a pair of straps 16 which terminate with hooks of other fittings adapted to engage the bumper, frame, or axle of the towed vehicle. Because the forwardmost point of contact with the towed vehicle is adjacent the extreme front and (rear end if rearward facing as illustrated in FIG. 1), the weight of the towed vehicle is quickly positioned vertically over, or forward of, the axis of the wheels 18 of the dolly even though the wheels of the towed vehicle remain rearward thereof.

Towing dollies of this type are shown, for example, in U.S. Pat. Nos. 3,627,154 to Troup dated Dec. 14, 1971, No. 3,827,586 to Lambert dated Aug. 6, 1974, No. 3,896,949 to Shipley dated Dec. 5, 1973, arid Design Patent No. 288,912 to Lucas dated Mar. 24, 1987.

A towing system has been developed which does not attach to the towed vehicle's bumper, undercarriage, or axle. In such system, the towing mechanism lifts the wheels of the towed vehicle, leaving the vehicle riding on its own suspension system. Such systems are referred to herein as "wheel lift" towing systems.

While wheel lift systems avoid damage to the towed vehicle, there has been a significant problem in their use. Such systems, lifting as they must at a point well to the rear of the wheels of the towing vehicle, have been confined in use to tow trucks and other vehicles with weighted front ends, such weight being necessary to resist the tendency of the lifting mechanism, with its large moment arm, to lift the front end of the towing vehicle rather than that of the towed vehicle. U.S. Pat. No. 4,737,066 to Allison dated Apr. 12, 1988, and No. 4,741,661 to Carey dated May 3, 1988 are exemplary of such wheel lift systems.

Thus, while the wheel lift mechanism is highly desirable for towing dollys, the longer reach from the axis of the road-engaging wheels of the towing dolly to the wheels being lifted requires that lifting mechanism extend under the vehicle without contacting the vehicle's frame or bumper a distance which has presented an insurmountable obstacle. When the towed vehicle is being elevated, the longer moment arm tends to rotate the front end of the dolly about the axis of its road-engaging wheels and to produce a highly undesirable negative tongue weight.

It is accordingly an object of the present invention to provide a novel wheel lift towing dolly which obviates many of the problems of known dollies.

It is another object of the present invention to provide a novel towing dolly for lifting one end of a towed vehicle without contacting the frame, bumper, or axle thereof.

It is yet another object of the present invention to provide a novel towing dolly with a pair of horizontally disposed wheel lifting arms carried by a carriage on a single inclined rail without unacceptable torquing of unibody vehicles.

It is still another object of the present invention to provide a novel towing dolly capable of lifting the wheels of a towed vehicle vertically over or forward of the wheels of the towing dolly to provide a positive tongue weight.

It is a further object of the present invention to provide a novel wheel lift towing dolly with means for preventing rotation of the dolly about the axis of its wheels during elevation of one end of the towed vehicle.

It is yet a further object of the present invention to provide a novel wheel lift towing dolly which does not require movement by the towed vehicle to load.

It is still a further object of the present invention to provide a novel wheel lift towing dolly in which the angle of lift may be selectively varied.

It is yet still a further object of the present invention to provide a novel wheel lift towing dolly with a simplified wheel supporting arm mechanism.

It is yet still another object of the present invention to provide a novel wheel lift towing dolly in which the wheel supporting arms move laterally outward into wheel engaging position.

It is another object of the present invention to provide a novel dolly capable of lifting a vehicle from either end. It is yet still another object of the present invention to provide a novel wheel lift mechanism assisted by an inflatable bag.

It is yet still a further object of the present invention to provide a novel dolly with an inflatable lift.

These and many other objects and advantages will be readily apparent to one skilled in the art to which the invention pertains from a perusal of the claims, the appended drawings, and the following detailed description of preferred embodiments.

THE DRAWINGS

FIG. 3 is a side view of an embodiment of FIG. 2 with the lifting mechanism lowered to engage the wheels a vehicle to be towed.

FIG. 4 is a side view of an embodiment of FIG. 2 with the lifting mechanism in the raised towing position.

DETAILED DESCRIPTION OF THE PREFERRED EMBODIMENTS

Figure 2:
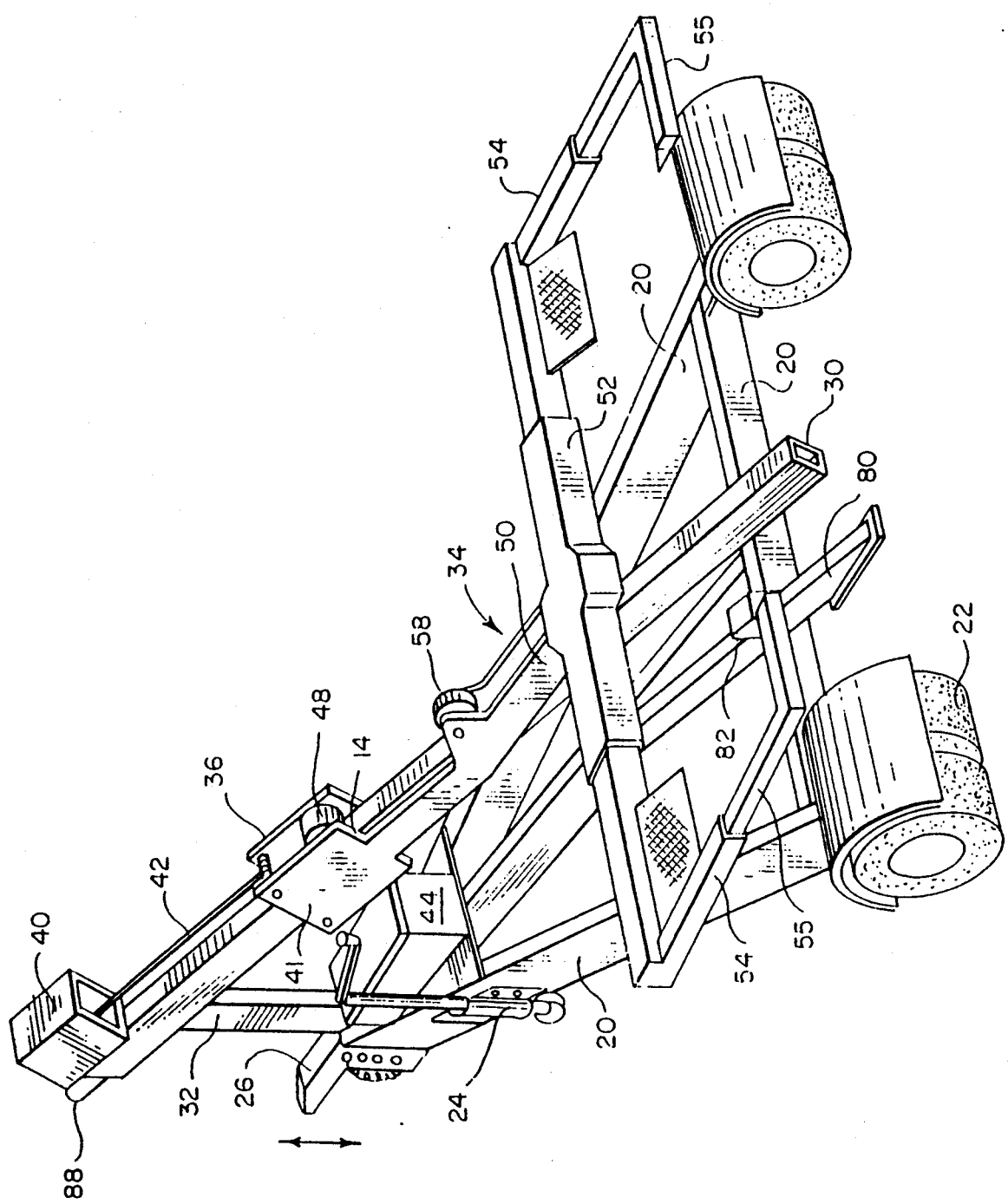
FIG. 2 is a pictorial of an embodiment of the towing dolly of the present invention.

With reference to FIGS 2-4, where like elements have been given like numerical designation to facilitate an understanding of the present invention, the towing dolly may comprise a horizontal triangular frame 20, an inclined rail 30, and a carriage 36 with a horizontally disposed wheel lifting member 34 adopted to ride thereon.

The frame 20 may be constructed of a suitable structural material such as steel tubing. Road-engaging wheels 22 may be provided at the base of the triangle, preferably in pairs and with a diameter less than conventional automobile tires, i.e., about 16 inches. The hitch-to-axle distance is desirably about 115 inches. As may be seen in FIG. 2, wheel covers or feeders 28 may be provided that are capable of bearing the weight of one end of the towed vehicle if necessary. It is desirable that at least the rearward portion of such fenders be rounded to conform generally to the slope of the wheel, as such shape reduces the likelihood of contact with the towed vehicle as it is lifted.

A conventional retractable support 24 with a small wheel may be provided for manual positioning of the dolly for attachment to and detachment from the towing vehicle, and to adjustably support the apex of the frame 20 when it is not attached to a towing vehicle.

A suitable conventional hitch 26 may be provided at the apex of the frame for attaching the dolly to a towing vehicle. The height of the hitch 26 relative to the frame 20 may selectively be adjusted to accommodate differing heights of towing vehicles without changing the horizontal attitude of the frame 20.

With continued reference to the FIGS. 2-4, a rail 30 may be supported at the apex of the triangular frame 20 by a post 32 and may be suitable braced to the sides of the frame. The rail 30 may be rearwardly and downwardly inclined at an angle between about 15 and 16 degrees to the center of the base of the frame 20. The upper and lower surfaces of the rail 30 may be planar, parallel, and load bearing. To this end, the rail 30 may have a generally rectangular cross section and be constructed of steel tubing.

A carriage 36 is adapted to ride the rail 30. The carriage 36 is movably carried by the rail 30 and conveys the weight of the towed vehicle from the lifting member 34 through the rail and frame to the wheels 22. The carriage 36 also provides directional control to the lifting member 34 when the towed vehicle is being elevated. As seen particularly in FIG. 3, the length of the rail 22 should be sufficient to allow the wheel lifting member 34 to reach the road surface with the carriage 36 on the rail 30.

The upper end of the rail 30 adjacent the apex of the triangular frame 20 may be provided with a suitable conventional winch 40 and wire cable 42 for pulling the carriage 36 and its wheel lifting member 34 up the inclined rail 30 from the position shown in FIG. 3 to the position shown in FIG. 4.

The winch 40 may be electrically powered, for which a suitable conventional storage battery 44 may be carried by the frame. Alternatively, electrical power may be supplied by the electrical system of the towing vehicle through a suitable conventional quick connect/disconnect plug (not shown). In another embodiment, the carriage 36 may be forced up the rail 30 by suitable conventional hydraulic means 38 anchored on the frame 20 adjacent the wheel axis thereof.

As seen in FIGS. 3 and 4, the carriage 36 may be constructed of side panels 46 for carrying load bearing rollers 48, one roller contacting the upper surface of the rail 30 and the other roller being spaced therefrom about 24 inches upwardly along the rail 30 and contacting the lower parallel surface of the rail. The rollers 48, spaced apart to provide directional control, should not disengage the rail over the full range of travel of the carriage, i.e., about six feet.

The rollers 48 may be mounted so that their horizontal axes are generally parallel to the axis of the wheels 22 and are desirably about 2.5 inches in diameter, supported on needle bearings and may be provided with flanges on both ends for additional lateral stability.

The wheel lifting member 34 may be joined with the side panels 46 of the carriage 36 to provide the means for reaching under the towed vehicle to engage the vehicle's wheels for lifting one end thereof. The lifting member 34 is pulled up the rail 30 by its rigid attachment to the carriage 36 to thereby elevate one end of the towed vehicle. The lifting member 34 remains generally horizontal during the entire range of movement of the carriage 36 along the rail 30 so as to avoid contact with, and possible damage to, the towed vehicle.

Figure 5:
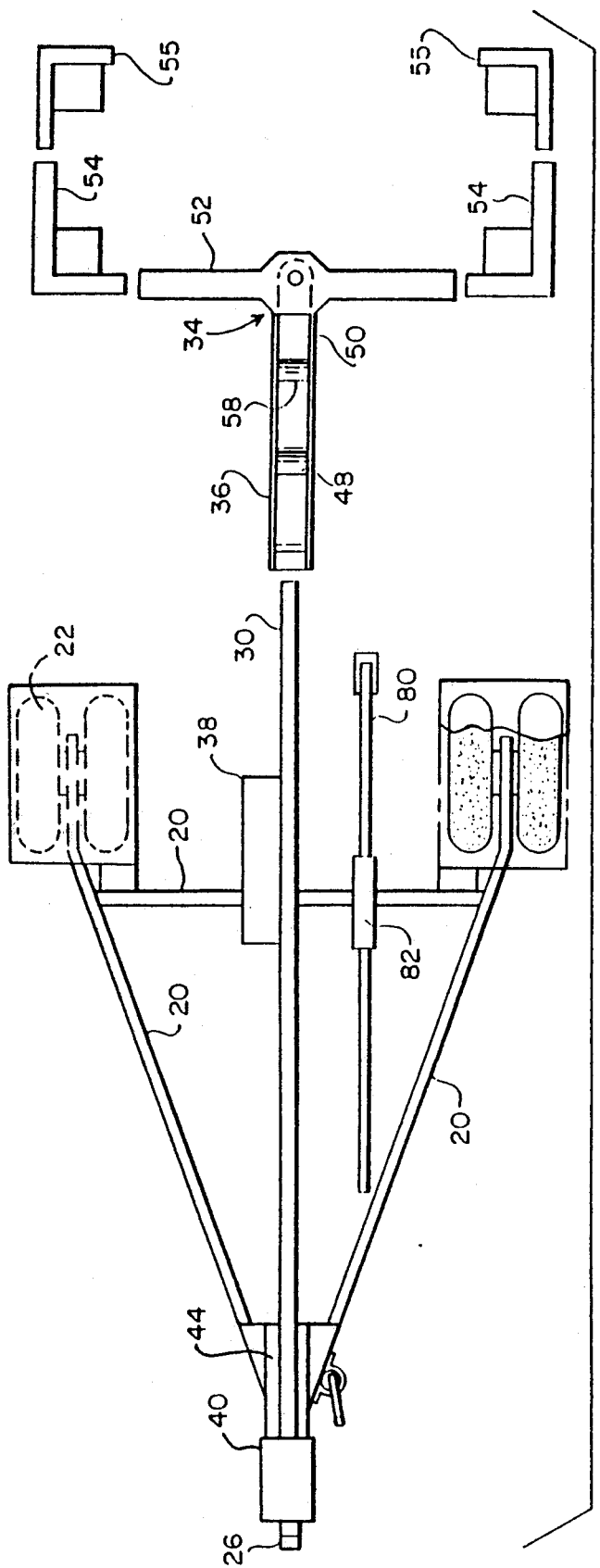
FIG. 5 is an exploded top plan view of the embodiment of FIG. 2 showing the carriage and three component lifting member separated from the frame and rail of the towing dolly.

As may be seen in FIGS. 2 and 5, the wheel lifting member 34 may comprise a central arm 50, a crossbar 52, and two pairs of wheel-engaging arms 54, 55. The crossbar 52 may be pivotably attached to the end of the carriage arm 50 to improve the stability of the dolly during towing and to avoid unacceptable torquing of vehicles with unibody construction during turning.

The crossbar 52 may be hollow to receive the forward, rearward facing, wheel-engaging support 54 telescoping therein to provide an adjustment for the width of the towed vehicle. A second L-shaped tire support 55 may be removable for positioning the dolly relative to the vehicle to be towed with the arms 54 engaging the tires of the towed vehicle, and thereafter inserted. A suitable conventional strap may be used to secure the wheels to the lifting member 34.

A roller 58 may be affixed to the carriage arm 50 to engage the upper surface of the rail 30 for at least part of the range of movement of the carriage 36 therealong. As seen in FIG. 4, the roller 58 may act with the rollers 48 to support the lifting member 34 to provide additional directional control for the carriage and lifting member as they move up the rail 30. The roller 58 may not engage the rail when the lifting member is in contact with the road surface so as to reduce the moment arm when the towed vehicle is first lifted.

Figure 6:
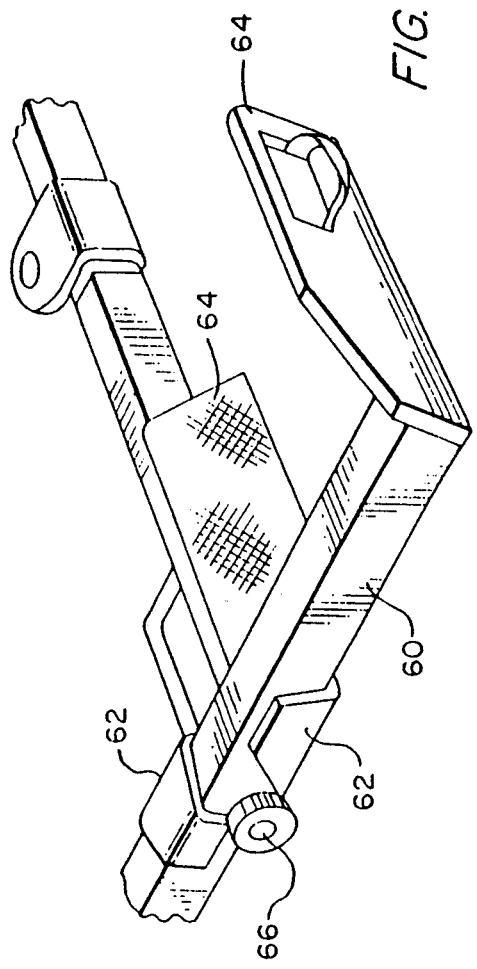
FIG. 6 is a pictorial view of a second embodiment of the lifting member.
Figure 7:
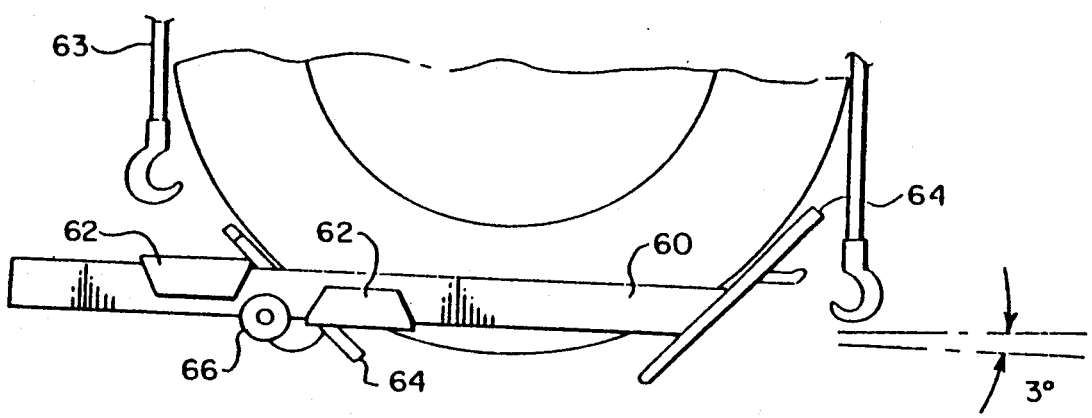
FIG. 7 is a schematic drawing in elevation of the lifting member of FIG. 6 in contact with a wheel.

An alternative to the lifting member 34 shown in FIGS. 2 and 5 is shown pictorially in FIG. 6 and schematically in FIG. 7 where the L-shaped arms 60 are easily inserted downwardly from the rear into at a "groove" formed by a pair of brackets 62. It is important that the final angle of the arms be slightly elevated at the rear so that the arms may easily be inserted into close proximity, preferably contact with, the wheel without interference caused by contact of the arm 60 with the road surface. An angle to the horizontal of about 3 degrees has been found appropriate.

A conventional manual operated ratchet and paul assembly operated by the manual rotation of a wheel 66 may be used to position the arm 60 relative to the brackets 62 so as to further ensure contact between the tire and the tire supports 64.

The addition of a road surface engaging roller 68 beneath the forward wheel engaging support 62 has also been found helpful in minimizing the spacing between the support 62 and the wheel, i.e., without the elevation provided by the roller, contact of the lower surface of the support 62 with an uneven road surface may prevent rearward movement of the dolly into contact of the upper surface of the support 62 with the wheel.

Figure 8:
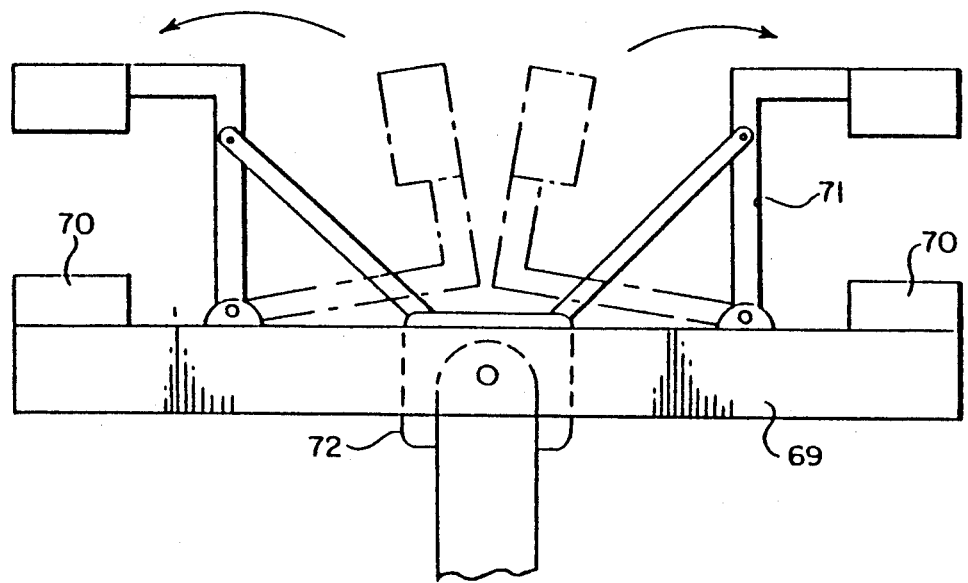
FIG. 8 is a schematic drawing in plan view of a third embodiment of the wheel lifting member.

In the embodiment illustrated in FIG. 8, the cross bar 69 with its rearward facing wheel engaging surfaces 70 may remain pivotably connected to the carriage (not shown) and the two L-shaped arms 71 pivoted from the position shown in dashed lines to the wheel engaging position shown in solid lines. The positioning of the L-shaped arms 71 may be simultaneously effected by any suitable conventional mechanical linkage 72 such as screw threads, hydraulic actuated piston or the like.

Figure 1:
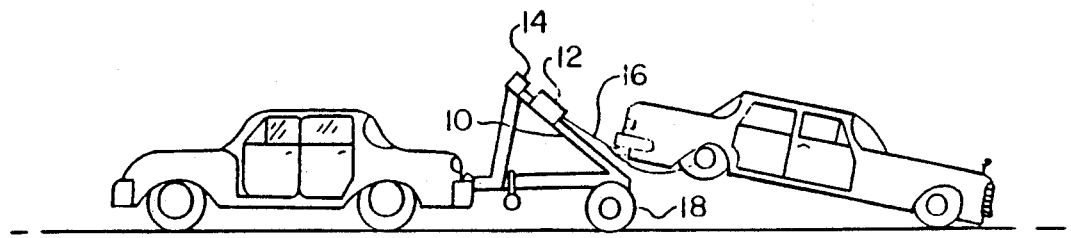
FIG. 1 is a pictorial representation of prior art towing dolly.
Figure 10:
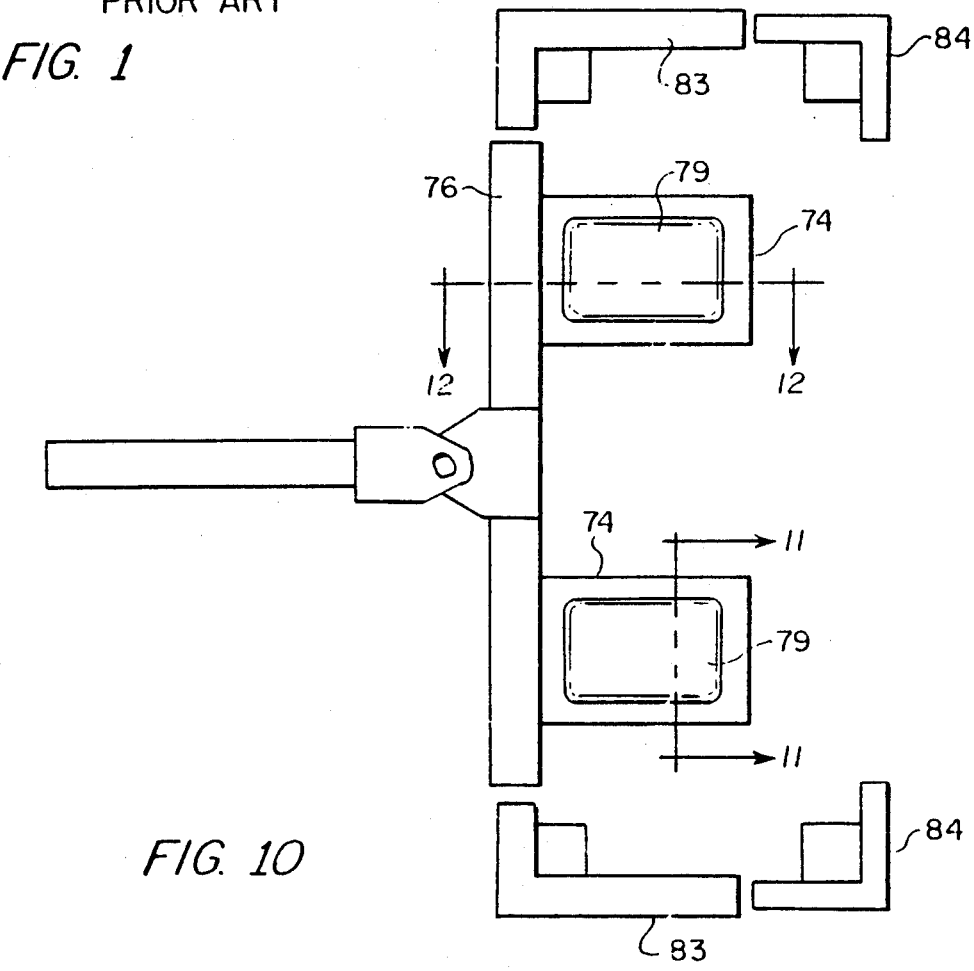
FIG. 10 is a schematic drawing in top plan view of a third embodiment of the present invention showing the use of an inflatable bag to assist the lifting vehicle.
Figure 11:
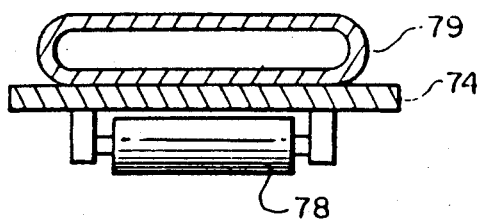
FIG. 11 is a vertical section taken through line 11—11 of FIG. 10.
Figure 12:
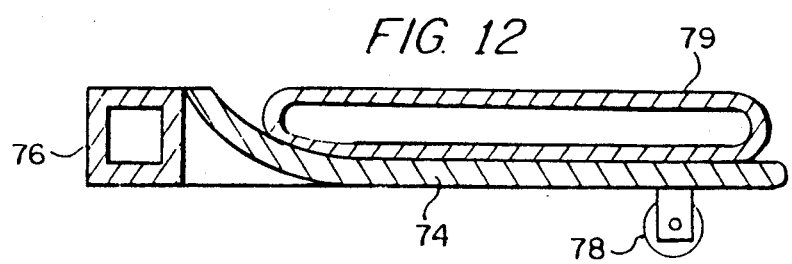
FIG. 12 is a vertical section taken through line 12—12 of FIG. 10.

In the embodiment illustrated in FIG. 10, the wheel lifting member may include a pair of flat arms 74 extending rearwardly from the crossbar 76. The arms 74 may be supported by one or more ground engaging rollers 78. Attached to the upper surface of the arms 74 may be an inflatable bag 79 selectively inflated when in position beneath the vehicle axle to raise the vehicle sufficiently to adjust the position of the wheel engaging arms 83, 84. This particularly desirable where, for example, the vehicle to be towed has two flat tires and it may be difficult to close the arms 83, 84 to a position where the vehicle may be safely lifted and towed solely by support of the tires. The bag 79 may remain inflated during towing to provide additional support to that provided by the wheel engaging arms 83, 84, or alternatively deflated.

Inflation of the bag 79 may be by any suitable conventional means not shown, desirably by a flexible hose removably connected to a cone manually positioned over the end of the towing vehicle exhaust pipe so that the towing vehicle may provide the lifting power.

By proper selection of the size and shape of the bag 79, the vehicle may be supported solely by the bag 79 and the wheel-engaging arms 83, 84 omitted from the structure altogether. If the arms 83, 84 are omitted, the vehicle may be secured by means other than the straps 63 shown in FIG. 7, e.g., axle chains or straps.

With reference again to FIGS. 3 and 4, the frame 20 may carry a brace 80 to provide a force resisting the rotation of the dolly about the wheels 22 during the initial lifting of the towed vehicle. As seen in FIGS. 2-5, the brace 80 may be mounted on the base member of the frame 20 below and generally parallel to the rail 30. The brace 80 may thus slide parallel to the rail 30 into position to engage the road surface when the towed vehicle is being lifted, and to thereafter be slidably retracted from contact with the road surface when the dolly is to be moved. The brace 80 and its housing 82 may be constructed of any material of suitable structural strength such as steel tubing.

Alternatively, the brace 80 may be carried internally of the hollow rail 30 and its position selectively telescoped with respect thereto by manually operated means 88 at the upper end of the rail 30 e.g., a threaded rod.

Figure 9:
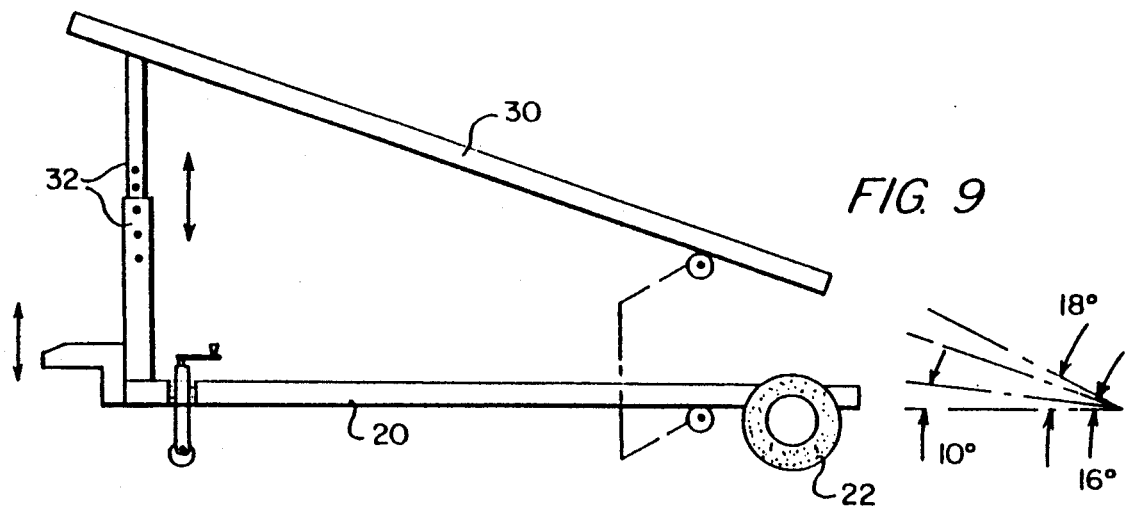
FIG. 9 is a schematic drawing in elevation illustrating the adjustment of the angle of the rail.

As shown schematically in FIG. 9, the rail 30 may be pivotably secured to the frame 20 at or near the axle of the ground engaging wheels 22 and the height of the front end of the rail 30 selectively adjusted relative to the frame 20 by the telescoping of the post 32 in any suitable conventional manner such as a manually cranked ratchet and pawl (not shown).

In this way, the angle of the rail 30 relative to the plane of the frame 20 may be selectively adjusted between about 10-18 degrees for loading the towed vehicle. Adjusting of the angle may enhance the number of different vehicles (each variable in ground clearance, wheel diameter, bumper overhang, exhaust pipe location, etc.) which may be loaded onto the dolly without contact between the frame 20 and the towed vehicle.

After loading to a position where the wheels of the towed vehicle are directly above or slightly forward of the wheels of the dolly, the angle of the rail 30 relative to the frame 20 may be readjusted to the 15-16 degrees at which towing is preferred, and mechanically locked in that position by any suitable conventional means. It has been found that each inch of forward movement of the axis of the wheels of the towed vehicle relative to the axis of the wheels of the dolly increases tongue weight approximately 50 pounds, and that a tongue weight, including the weight of the dolly, of between 400 and 600 pounds is desirable for towing.

Alternatively, or additionally, the selective height adjustment between the frame 20 and the hitch 26 may be used to change the angle of inclination of the frame 20, and thus the rail 30, relative to the road surface for loading of the towed vehicle.

While preferred embodiments of the present invention have been described, it is to be understood that the embodiments described are illustrative only and that the scope of the invention is to be defined solely by the appended claims when accorded a full range of equivalence, many variations and modifications naturally occurring to those skilled in the art from a perusal hereof.

We claim:

1. In a towing dolly for towing a wheeled vehicle, said towing dolly having a frame with ground engaging wheels, a tow hitch at the front end thereof, a rearwardly and downwardly inclined rail, and a vehicle engaging carriage selectively movable along said rail to thereby raise from the ground the wheels at only one end of the vehicle to be towed, the improvement wherein said carriage includes means adopted to lift the wheels of the vehicle to be towed at the end thereof to be raised without otherwise contacting such vehicle so that such vehicle may be supported on said wheel engaging means by its suspension system for towing and structural damage thereto avoided.

2. The towing dolly of claim 1 including means for selectively determining the angle of said rail relative to the ground during towing.

3. The towing dolly of claim 2 wherein said selective angle determining means includes means for adjusting the height of said tow hitch relative to said frame.

4. The towing dolly of claim 2 wherein said selective angle determining means includes means for adjusting the height of the upper end of said rail relative to said frame.

5. The towing dolly of claim 2 wherein said selective angle determining means includes means for adjusting the height of the front end of said frame relative to said hitch.

6. The towing dolly of claim 2 wherein the angle of said rail relative to the ground is selectively determinable over a range from about ten degrees to about eighteen degrees.

7. The towing dolly of claim 1 wherein the angle of inclination of said rail relative to said frame is between about fifteen degrees and about sixteen degrees.

8. The towing dolly of claim 1 wherein said wheel engaging means is inclined rearwardly and upwardly relative to said frame.

9. The towing dolly of claim 8 wherein the angle of said incline is approximately three degrees.

10. The towing dolly of claim 1 wherein said wheel engaging means includes roller means adapted for engaging the ground when said carriage is fully lowered along said rail whereby a predetermined minimum spacing of said wheel engaging means from the ground is maintained.

11. The towing dolly of claim 1 including electrically powered winch and cable means carried by one of said frame and said rail for selectively moving said carriage along said rail.

12. The towing dolly of claim 1 including hydraulically powered piston means for selectively moving said carriage along said rail.

13. The towing dolly of claim 1 wherein said carriage is supported for movement along said rail by two bearing means spaced not less than about 24 inches apart.

14. The towing dolly of claim 1 wherein said carriage is supported for movement along said rail by two roller bearing means, each not less than about 2.5 inches in diameter.

15. The towing dolly of claim 1 wherein said frame includes means other than said tow hitch for selectively resisting the upward rotation of the front end thereof about said wheels as said carriage is subjected to a portion of the weight of the vehicle to be towed as it is selectively moved upwardly along said rail in engagement with the wheels of the vehicle to be towed.

16. The towing dolly of claim 15 wherein said rotation resisting means includes a rigid member carried by said frame for selective movement along a path substantially parallel to said rail into contact with the ground.

17. The towing dolly of claim 16 wherein:
(a) said rail is hollow;
(b) wherein said rigid member is carried internally of said rail; and
(c) rotation resisting means including threaded means manually operable from the upper end of said rail.

18. The towing dolly of claim 1 wherein said carriage means includes inflatable bag means for providing an additional lifting force to the underside of the vehicle to be towed.

19. The towing dolly of claim 18 wherein said bag means includes means for providing support for the towed vehicle when said carriage is selectively moved along said rail.

20. In a towing dolly for towing a wheeled vehicle having a frame with ground engaging wheels, a tow hitch at the front end thereof, a rearwardly and downwardly inclined rail, and a vehicle engaging carriage selectively movable along said rail to raise only one end of such vehicle, the improvement wherein said carriage is adapted to engage only the wheels at one end of the vehicle to be towed and wherein said frame includes means other than said tow hitch for selectively resisting the upward rotation of the front end thereof about said wheels as said carriage is selectively moved upwardly along said rail in engagement with the wheels of the vehicle to be towed and is thereby subjected to a portion of the weight of the vehicle to be towed.

21. The towing dolly as defined in claim 20 wherein said rotation resisting means includes a rigid member carried internally of said rail for selective rearward and downward extension therefrom into contact with the ground rearwardly of said wheels.

22. In a towing dolly for towing a wheeled vehicle having a frame with ground engaging wheels, a tow hitch at the front end thereof, a rearwardly and downwardly inclined rail, and a vehicle engaging carriage adapted to be selectively movable along said rail to thereby raise only one end of the vehicle to be towed, the improvement including means for (a) selectively adjusting the angle of inclination of said rail relative to said frame while the vehicle to be towed is being raised to the desired towing position whereby the path along which the vehicle to be towed is raised may selectively be varied so as to avoid structural damage to such vehicle by contact with said dolly as said one end of such vehicle is raised into the desired towing position and (b) thereafter locking said rail into a desired inclination for towing.

23. The towing dolly of claim 22 wherein said frame includes means other than said tow hitch for selectively resisting the upward rotation of the front end thereof about said wheels as said carriage is subjected to a portion of the weight of the vehicle to be towed by movement of said carriage forwardly along said rail in engagement with the vehicle to be towed.

24. A method of towing a vehicle comprising the steps of:
(a) providing a frame having a two hitch at the front end thereof and ground engaging wheels;
(b) providing means for engaging the wheels of a vehicle to be towed;
(c) positioned the wheel engaging means in a first position in close proximity to the wheels of the vehicle to be towed;
(d) securing the wheel engaging means to the wheels at one end of the vehicle to be towed without otherwise engaging the vehicle to be towed;
(e) bracing the frame to resist a force tending to upwardly rotate the front end of the frame;

(f) moving the wheel engaging means upwardly and forwardly relative to the frame from the first position, through a second position at which the weight of the vehicle to the towed creates a force tending to upwardly rotate the front end of the frame about its wheels, to a third position at which the force tending to upwardly rotate the front end of said frame about its wheels is eliminated; and (g) unbracing the frame.

25. A towing dolly for towing a wheeled vehicle comprising:

(a) a frame having a plurality of road surface engaging wheels;

(b) coupling means carried by said frame at the front end thereof for selectively coupling said frame to a towing vehicle;

(c) a rail carried by said frame at an incline of between about 10 to 18 degrees with respect thereto;

(d) a carriage carried by said rail for travel therealong, said carriage terminating at its rearward end in a generally horizontally extending means for raising the wheels at one end of the vehicle to be towed from the road surface as said carriage moves upwardly and forwardly along said rail without contacting the frame or bumper of such vehicle so that the ride of the towed vehicle supported by said generally horizontally extending means is cushioned by the shock absorbing system of the towed vehicle; and (e) means for selectively causing said carriage to travel along said rail.

26. The vehicle towing dolly of claim 25 including means carried by said frame forwardly of said wheels for selectively engaging the surface of the road rearwardly of said wheels to thereby selectively brace said frame against the upward rotation of said coupling means about the axis of said wheels in response to the weight of the towed vehicle on the carriage while said carriage is positioned rearwardly of the axis of said wheels.

27. A towing dolly comprising:

a generally triangular frame relatively narrow at the front end thereof and relatively broad at the rear end thereof;

four coaxial ground engaging wheels carried by said frame adjacent the relatively broad rear end thereof;

a ball type trailer hitch carried by said frame adjacent the front end thereof;

an upright post carried by said frame adjacent the front end thereof;

a rail carried by said post at the upper forward end thereof and extending rearwardly and downwardly to the rear end of said frame;

a carriage mounted on said rail for movement therealong, said carriage including bearing means for rolling contact with said rail;

a winch carried adjacent to the junction of said post and said rail for selectively moving said carriage along said rail; and vehicle lifting means carried by said carriage for pivotable movement in a generally horizontal plane for selectively engaging the wheels of the vehicle to be towed.

28. The towing dolly of claim 27 wherein said frame, said post and said rail comprise rectangular hollow metal tubing.

29. The towing dolly of claim 27 wherein the angle of said rail to said frame is between about ten and about eighteen degrees.

30. The towing dolly of claim 27 including manually positionable means other than said trailer hitch for selectively resisting the upward movement of said frame about the axis of said wheels as said carriage moves over the lower end of said rail lifting the wheels at one end of the vehicle to be towed out of contact with the ground.

31. A towing dolly comprising:

a frame with ground engaging wheels;

a tow hitch at the front of said frame for coupling said frame to a towing vehicle;

a downwardly inclined rail carried by said frame;

a towed vehicle engaging carriage, pivotable in a generally horizontal plane, for raising one end of the towed vehicle from the ground;

a winch for selectively moving said carriage along said rail in rolling contact therewith to a position at which the entirety of the wheels at the raised end of the towed vehicle are at a higher elevation than the wheels of the dolly; and means for adjusting the operative angle of said rail relative to the ground to between about ten and about eighteen degrees.

32. The towing dolly of claim 31 wherein said rail angle adjusting means includes means for adjusting the relative height of said tow hitch relative to said frame.

33. The towing dolly of claim 31 wherein said rail angle adjusting means includes means for adjusting the height of the upper end of said rail relative to said frame.

34. A method of towing a wheeled vehicle with the wheels at one end thereof engaging the ground comprising the steps of:

(a) providing a frame having a tow hitch at the front end thereof, at least two coaxial ground engaging wheels, and an inclined rail;

(b) providing a carriage selectively moveable along the rail, said carriage being adapted to engage only the wheels at one end of a vehicle to be towed;

(c) positioning the wheel engaging portion of the carriage in a first position in close proximity to the wheels at one end of the vehicle to be towed by at least one of (i) positioning the frame relative to the vehicle to be towed and (ii) positioning the carriage relative to the rail;

(d) securing the wheel engaging portion of the carriage to the wheels at one end of the vehicle to be towed; and (e) moving the carriage upwardly and forwardly along the rail to simultaneously move the carriage upwardly and forwardly relative to the frame.

35. A vehicle towing dolly comprising:

(a) a generally triangular frame having a plurality of coaxial road surface engaging wheels;

(b) coupling means carried by said frame adjacent one apex thereof for selecting coupling said frame to a towing vehicle;

(c) a rail carried by said frame at an incline of between about ten to about eighteen degrees with respect thereto;

(d) a carriage carried by said rail for travel therealong, said carriage terminating at its rearward end in a generally horizontally extending means for raising one end of the vehicle to be towed from the road surface as said carriage moves upwardly and forwardly along said rail; and (e) winch means for selectively causing said carriage to travel along said rail.

36. The towing dolly of claim 35 wherein said carriage is supported for movement along said rail by two roller bearing means spaced not less than about 24 inches apart, and not less than about 2.5 inches in diameter.

37. The towing dolly of claim 36 wherein said frame includes manually positionable means other than said tow hitch for selectively resisting the upward rotation of the front end thereof about said wheels as said carriage is subjected to the weight of the vehicle to be towed as one end thereof is lifted from the road surface.

38. In a towing dolly for towing a wheeled vehicle having a frame with ground engaging wheels, a tow hitch at the front end thereof, a rearwardly and downwardly inclined rail, and a vehicle engaging carriage selectively movable along said rail to thereby raise the wheels at one end of the vehicle to be towed from the ground without raising the wheels at the other end of the vehicle to be towed, the improvement wherein said inclined rail is inclined at angle between 10 and 18 degrees relative to said frame.

39. A towing dolly for towing a wheeled vehicle comprising:
   (a) a rigid frame with at least two coaxial ground-engaging wheels and a tow hitch at the front end thereof;
   (b) a rearwardly and downwardly inclined rail carried by said frame;
   (c) a vehicle-engaging carriage selectively moveable along said rail;
   (d) means carried by said frame for selectively moving said vehicle-engaging carriage upwardly along said rail; and
   (e) a rigid member carried by said frame for selective movement along a downwardly inclined path generally parallel to said rail into contact with the ground at a point rearwardly of said wheels for resisting upward rotation of the front end of said frame about said wheels when said carriage is subjected to the weight of the vehicle to be towed as said vehicle-engaging carriage moves forwardly and upwardly along the lower rearward end of said rail.

40. The towing dolly as defined in claim 39 wherein said rigid member is manually moveable and wherein the path along which said rigid member moves is parallel to said rail.

41. The dolly as defined in claim 34 wherein said vehicle engaging carriage comprises means for lifting the wheels at one end of the vehicle to be towed without lifting the wheels at the other end of such vehicle so that such vehicle may be supported on said wheel engaging means by its suspension system and structural damage thereto avoided.

42. A towing dolly for towing a wheeled vehicle compromising:
   a frame with ground engaging wheels;
   a tow hitch at the front of said frame for coupling said frame to a towing vehicle;
   a rearwardly and downwardly inclined rail carried by said frame;
   a towed vehicle engaging carriage pivotable in a generally horizontal plane to permit articulation of the towed vehicle relative to the dolly, said carriage being relatively movable along said rail to thereby raise the wheels at one end of the towed vehicle from the ground to a height sufficiently to permit the towed vehicle to articulate relative to the dolly without significant interference between the wheels of the towed vehicle and the wheels of the dolly; and
   means for selectively moving said carriage along said rail.

43. A towing dolly for towing a wheeled vehicle comprising:
   a frame with ground engaging wheels
   a tow hitch at the front of said frame for coupling said frame to a towing vehicle;
   a rearwardly and downwardly inclined rail carried by said frame;
   a carriage adapted to engage the wheels at one end of the vehicle to be towed without otherwise contacting such vehicle;
   means for selectively moving said carriage along said rail to thereby raise one end of the towed vehicle to a towing position at which the axle of the wheels at the raised end of the towed vehicle is above and forward of the axle of the wheels of the dolly to thereby place some portion of the weight of the towed vehicle on the towing vehicle through said tow hitch.

44. A towing dolly for a wheeled vehicle comprising:
   (a) a frame having a plurality of road surface engaging wheels;
   (b) coupling means carried by said frame at the front end thereof for selectively coupling said frame to a towing vehicle;
   (c) a rail carried by said frame at an incline of between about 10 to about 18 degrees with respect thereto;
   (d) a carriage carried entirely by said rail for travel therealong,
   said carriage terminating at its rearward end in a generally horizontally extending means for raising the wheels at one end of the vehicle to be towed as said carriage moves upwardly and forwardly along said rail without contacting the frame or bumper of such vehicle so that the ride of the towed vehicle supported by said generally horizontally extending means is cushioned by the shock absorbing system of the towed vehicle,
   said carriage being pivotable in a generally horizontal plane whereby the towed vehicle may articulate with respect to the towing dolly,
   said carriage raising the wheels at said one end of the vehicle to be towed from the road surface to a position at which the wheels of the towing dolly do not substantially interfere with the articulation of the towed vehicle with respect to the dolly, and
   (e) means for selectively causing said carriage to travel along said rail.

45. The towing dolly of claim 44 wherein the angle of said rail relative to said frame is selectively adjustable (a) to vary the path along which the vehicle is to be towed is raised to the towing position and (b) to vary the height of the towed vehicle when in the towing position.

* * * * *